United States Patent [19]
Tanaka et al.

[11] Patent Number: 5,440,222
[45] Date of Patent: Aug. 8, 1995

[54] EXCITATION CONTROL APPARATUS FOR SYNCHRONOUS MACHINE

[75] Inventors: Seiichi Tanaka; Megumi Fujikawa, both of Kobe, Japan

[73] Assignee: Mitsubishi Denki Kabushiki Kaisha, Tokyo, Japan

[21] Appl. No.: 910,240

[22] Filed: Jul. 9, 1992

[30] Foreign Application Priority Data

Jul. 15, 1991 [JP] Japan .................................. 3-200118
Aug. 26, 1991 [JP] Japan .................................. 3-213590

[51] Int. Cl.⁶ .......................... H02H 7/06; H02P 9/00; H02P 11/00
[52] U.S. Cl. .................................. 322/25; 322/29
[58] Field of Search ........................................... 322/25

[56] References Cited

U.S. PATENT DOCUMENTS

| | | | |
|---|---|---|---|
| 3,656,048 | 4/1972 | Hauf | 322/19 |
| 3,916,291 | 10/1975 | Raczkowski | 322/19 |
| 4,044,296 | 8/1977 | Dhyanchand et al. | 322/25 |
| 4,733,156 | 3/1988 | Tanaka . | |
| 4,788,653 | 11/1988 | Henderson et al. | 322/58 X |
| 4,967,129 | 10/1990 | Tanaka | 322/20 X |
| 5,055,765 | 10/1991 | Rozman et al. | 322/22 |

OTHER PUBLICATIONS

European Search Report, The Hague, completed Mar. 30, 1993.
Patent Abstracts of Japan, vol. 10, No. 42, (E-382)(2099) Feb. 19, 1986.
Patent Abstracts of Japan, vol. 8, No. 013 (E-222), Jan. 20, 1984.

*Primary Examiner*—Thomas M. Dougherty
*Assistant Examiner*—Nicholas Ponomarenko
*Attorney, Agent, or Firm*—Rothwell, Figg, Ernst & Kurz

[57] ABSTRACT

An excitation control apparatus for synchronous machine which coincides voltage/frequency ratio of a synchronous machine with a limited value without setting gains of an automatic voltage regulator considering the harmony between the automatic voltage regulator and voltage/frequency ratio limiter by means of adding the integrated output of a value corresponding to the deference between the limited value and obtained voltage/frequency ratio of the synchronous machine to a desired control value of the synchronous machine by the automatic voltage regulator.

13 Claims, 11 Drawing Sheets

EXCITATION CONTROL APPARATUS FOR SYNCHRONOUS MACHINE

BACKGROUND OF THE INVENTION

1. Field of the Invention

This invention relates to an excitation control apparatus for a synchronous machine.

2. Description of Related Art

FIG. 1 is a structural block diagram of a general excitation control system employed so far and disclosed, for example, in Japanese Patent Application Laid-Open No 58-176000 (1983). Such a system is represented in FIG. 1, where reference numerals respectively represent: 1 a synchronous machine, 2 field windings of the machine, 3 an exciter for feeding a field current to the field windings 2, 4 a potential transformer (PT) for detecting the voltage of the synchronous machine, 5 a current transformer (CT) for detecting the current of the synchronous machine 1, and 6 an automatic voltage regulator (AVR) for controlling the voltage of the synchronous machine 1 to be constant. The AVR 6 is specifically constituted of a voltage detection circuit 61 which detects the output of the PT4, a reference circuit 62 which generates a desired control value of the voltage of the synchronous machine 1, an amplifier circuit A 63 which amplifies the difference between the reference circuit 62 and the voltage detection circuit 61, a phase compensation circuit 64 which enhances the controlling stability of the voltage, an adding circuit 65 which adds signals from the other supplemental functional devices to be described later, and an amplifier circuit B 66 which amplifies the output of the adding circuit 65 and generates a signal to the exciter 3.

A power system stabilizer 7 detects the electric power from output signals of the PT 4 and CT 5 and supplies a supplementary signal to the AVR 6 thereby enhancing the stability of the system. Meanwhile, a V/Hz limiter 8 detects the V/Hz value(the ratio of the voltage V to the frequency Hz) from the output signals of the PT 4 and CT 5, feeds a supplementary signal to the AVR 6 and controls the V/Hz not to exceed a predetermined value. A power excitation limiter 9, by detecting the power and reactive power from the output signals of the PT 4 and CT 5, supplies a supplementary signal to the AVR 6 so as to drive the synchronous machine 1 at not lower than a predetermined level. The current flowing in the field windings 2 is detected by a shunt 10 which in turn outputs a signal to an overexcitation limiter 11. When the overexcitation limiter 11 detects the overexciting state not smaller than a predetermined value, it supplies a supplementary signal to the AVR 6 thereby to control to restrict the overexcitation.

The operation of the conventional controlling system in the structure described hereinbefore will now be depicted. The output voltage from the synchronous machine 1 is decreased by the PT 4. The signal of the PT 4 is inputted to the AVR 6 to be converted to a signal easy to amplify add, etc., (converted generally to a direct current signal) by the voltage detection circuit 61. The value from the reference circuit 62 is a desired control value for the AVR 6 to control the voltage of the synchronous machine 1. The output difference of the reference circuit 62 from the voltage detection circuit 61 is amplified to an appropriate value by the amplifier circuit A 63. If the amplified signal is positive, the output voltage of the synchronous machine 1 is lower than the desired control value of the voltage set by the reference circuit 62, and therefore, the AVR 6 outputs a control signal to raise the output of the exciter 3. As a result, the current flowing in the field windings 2 is increased and the output voltage of the synchronous machine 1 is eventually raised.

In the phase compensation circuit 64, the output of the amplifier circuit A 63 is compensated to increase the controlling stability, and the output signal from this phase compensation circuit 64 is added with outputs of various kinds of functional devices such as the power system stabilizer 7, V/Hz limiter 8 and the like in the adding circuit 65. The amplifier circuit B 66 amplifies the output of the adding circuit 65 properly and generates a signal proportional to the field current which is the output of the exciter 3 (i.e., the exciter 3 has an amplifying function as well). The output voltage of the synchronous machine 1 is controlled in the manner as above to the desired control value set by the reference circuit 62 within the AVR 6.

The amplifier circuit A 63 and B 66 and phase compensation circuit 64 are provided so that the output voltage of the synchronous machine 1 is agreed with the desired control value set by the reference circuit 62 in the AVR 6 as always as possible. Although it is ideal, needless to say, that the desired control value is coincident with the actual value at all times, the synchronous machine 1 itself has the time lag which produces the difference between the desired control value and actual value caused by an external disturbance to the controlling system, for example, when an accident happens at the output side of the synchronous machine 1, when the desired control value is changed, etc. Therefore, what the AVR 6 intends is to make control so as to remove the above difference as quickly as possible.

In the meantime, the V/Hz limiter 8 restricts the V/Hz value of the synchronous machine 1 under a predetermined value, with noting the fact that the current running in the synchronous machine 1 and coils of the transformers (not shown) is proportional to the V/Hz value. The V/Hz limiter 8 controls the current in the coils.

FIG. 2 is a block diagram of the transfer function representing the controlling characteristic of the AVR 6 and V/Hz limiter 8. Each of the exciter 3 and synchronous machine 1 is generally expressed by gains and first-order lag functions. In the AVR 6, amplifier circuit A 63, phase compensation circuit 64 and amplifier circuit B 66 are respectively represented by gains, first-order lead/lag functions and gains. Among those, the constants $K_E$, $T_E$ of the exciter 3 and constants $K_G$, $T_G$ of the synchronous machine 1 are fixed values the apparatus have. A gain $K_2$ of the amplifier circuit B 66 is generally an output amplifying gain of the AVR 6 and therefore a fixed value the regulator has. On the other hand, the constants of the amplifier circuit A 63 and phase compensation circuit 64 are variable which can be set, by a variable resistor or the like. The voltage controllability of the AVR 6 is determined by these variable constants $K_1$, $T_{lead}$, $T_{lag}$. These constants are designed beforehand on the basis of the constants of the synchronous machine 1 and exciter 3, but finally determined through individual adjustment. The V/Hz limiter 8 can be represented by gains and phase compensation similar to the AVR 6.

Because the conventional controller has the construction as above, when the frequency of the synchronous machine 1 is lowered, for instance, the V/Hz limiter 8 outputs a signal to lower the excitation. On the contrary, the AVR 6 outputs a signal to raise the excitation to make the voltage from the synchronous machine 1 constant. Therefore, it is necessary to set the respective gains to harmonize the V/Hz limiter 8 with AVR 6. It is also a drawback of the prior art that the desired V/Hz value of the V/Hz limiter 8 may not be perfectly coincident with the actual V/Hz, that is, an offset error increases.

Moreover, since the gain $K_1$ of the amplifier circuit A 63 and the time constants $T_{lead}$, $T_{lag}$ of the phase compensation circuit 64 should be set one by one, and if each constant of the exciter 3 or the synchronous machine 1 is different in the actual stage from the design stage, the above gain and time constants $K_1$, $T_{lead}$ and $T_{lag}$ should be individually adjusted, so that the values vary depending on the adjusting people. The optimum constants cannot always be obtained and, finding the proper adjusting becomes difficult.

SUMMARY OF THE INVENTION

This invention has been devised to solve the above-discussed problems, and has for its essential object to provide an excitation control apparatus for synchronous machine which does not require to set gains and the like considering harmonization of an AVR with a V/Hz limiter and which agrees a desired V/Hz value with the actual V/Hz value.

A further object of this invention is to provide an excitation control apparatus for synchronous machine capable of automatically obtain a control constant of an AVR simply by setting the constants of the synchronous machine and the exciter.

A yet further object of this invention is to provide an excitation control apparatus for synchronous machine capable of operating/setting amplification gains and time constants, instead of setting them one by one, from the actual values of constants of the exciter and synchronous machine by automatically measuring the actual values of the constants.

The above and further objects and features of the invention will more fully be apparent from the following detailed description with accompanying drawings.

DESCRIPTION OF THE PREFERRED EMBODIMENTS

This invention will be discussed in more detail hereinafter with reference to the accompanying drawings.

EMBODIMENT 1

Figure 1:
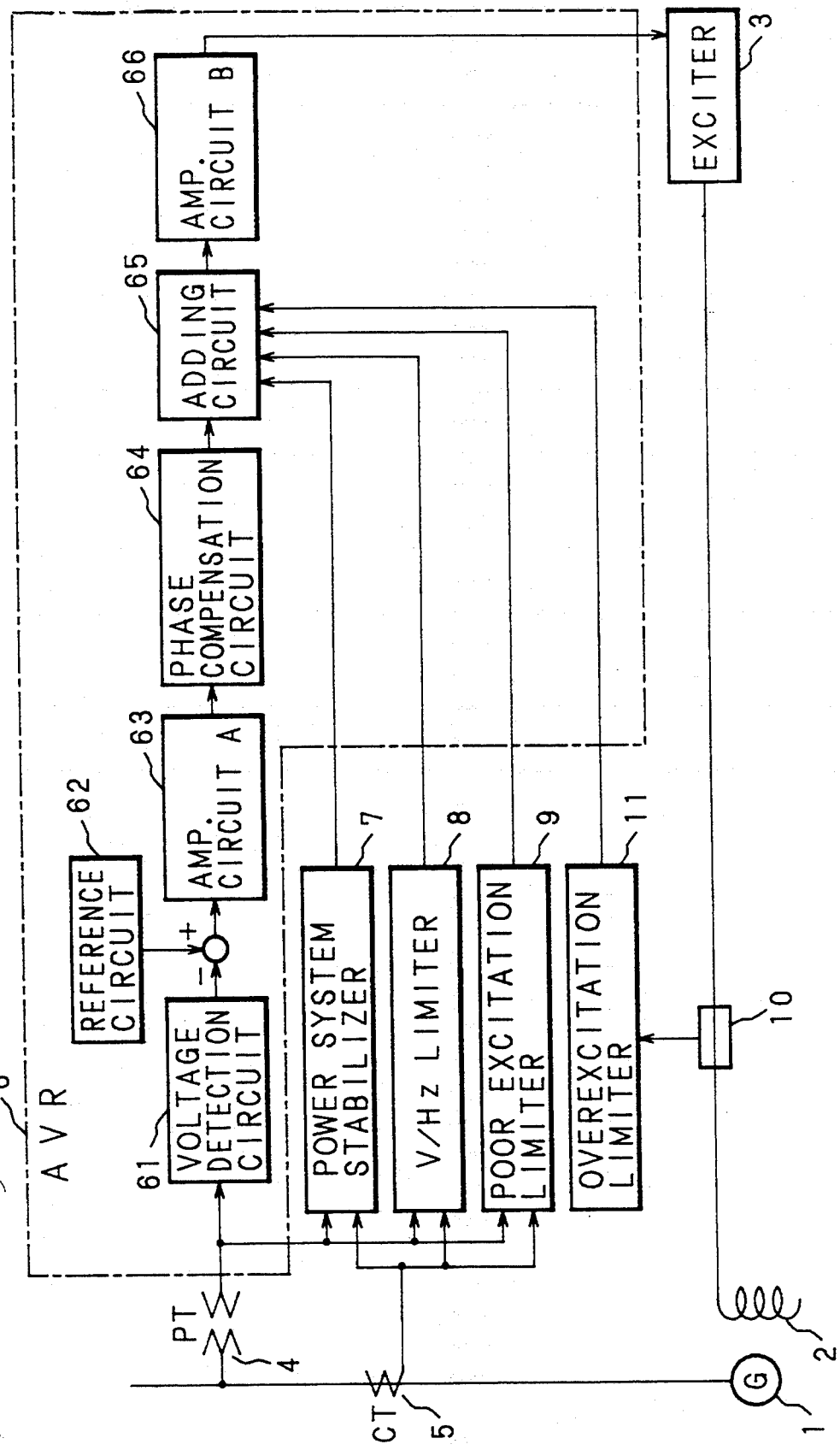
FIG. 1 is a structural block diagram of a conventional excitation controlling system.
Figure 3:
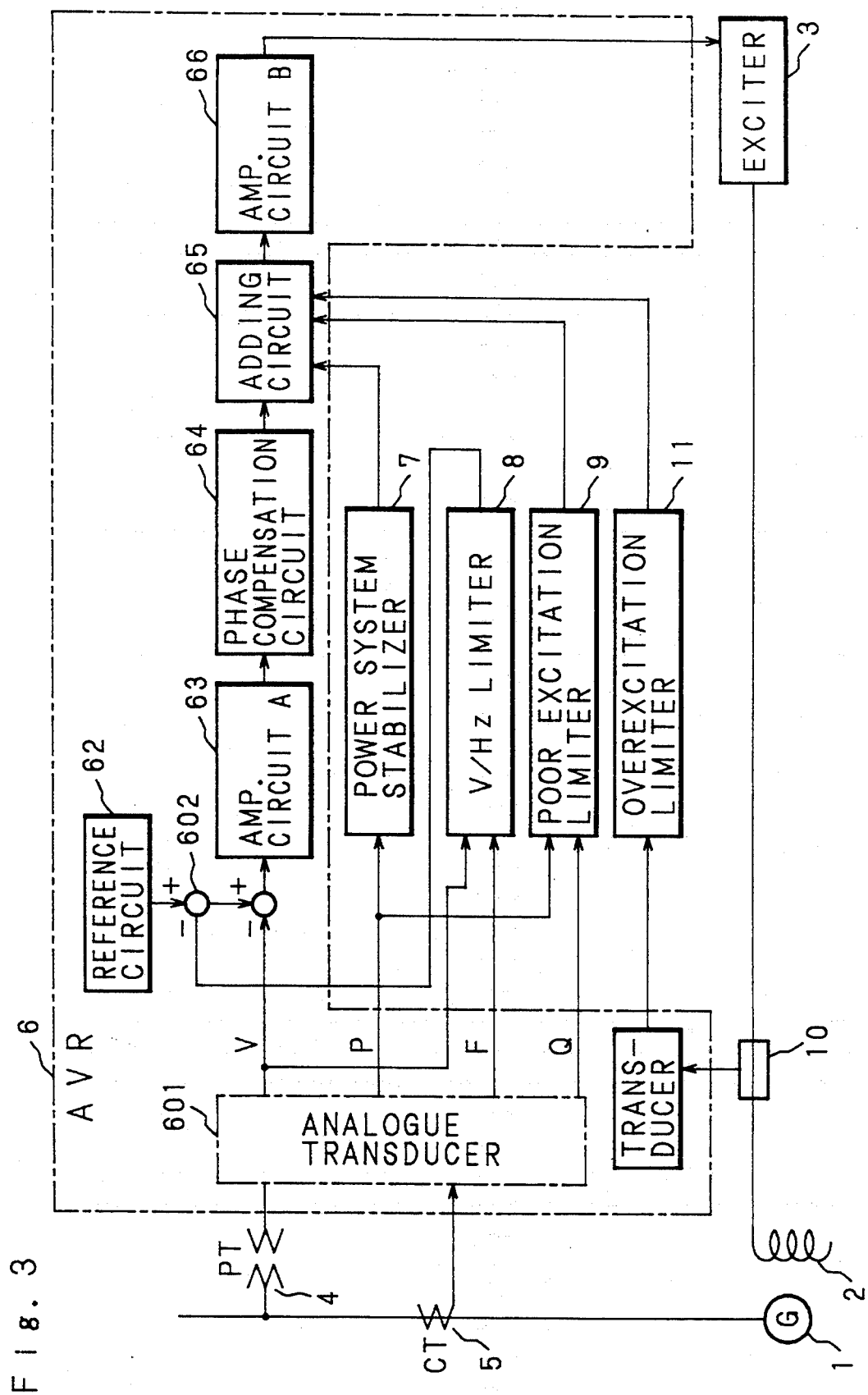
FIG. 3 is a structural block diagram of an excitation controlling system according to a first embodiment of this invention.

FIG. 3 is a structural block diagram of an excitation controlling system according to a first embodiment of this invention, in which the same parts are designated by the same reference numerals as in FIG. 1, and the description thereof will be abbreviated here. One structural difference of the first embodiment from FIG. 1 is to provide an analog transducer 601 which detects a voltage V, a power P, a frequency F and a reactive power Q from the signals of the PT 4 and CT 5 of the synchronous machine 1, and an adding circuit 602 which adds (actually subtracts) the output of the V/Hz limiter 8 to (from) the output of the reference circuit 62.

Figure 4:
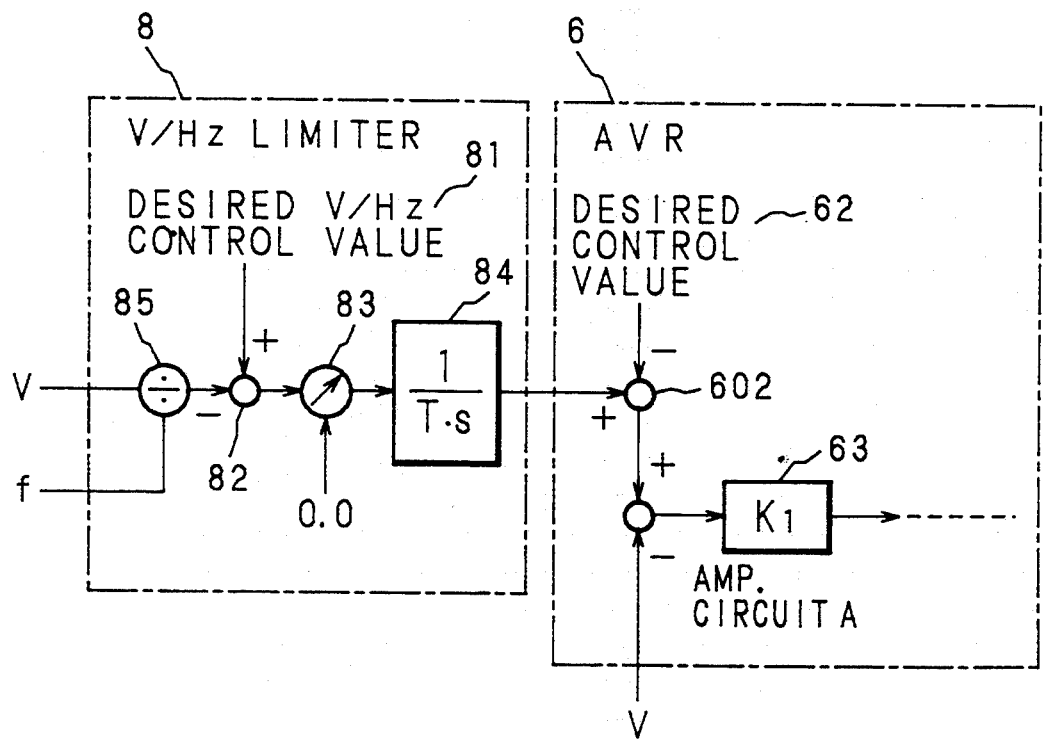
FIG. 4 is a block diagram of the transfer function of the first embodiment.

FIG. 4 is a block diagram indicative of the operation of the V/Hz limiter 8 and the connecting state of the V/Hz limiter 8 with the AVR 6 in the excitation controlling system of FIG. 3. In FIG. 4, a comparator 82 compares a desired V/Hz control value 81 of the V/Hz limiter 8 with the actual V/Hz value, and a switching device 83 outputs 0.0 when the actual V/Hz value is not larger than the desired control value 81, or the difference between the actual value and the desired control value in the cases other than the above. An integrator 84 is activated according to the output of the switching device 83. Reference numeral 85 denotes a divider for calculating the V/Hz value from the V and F values.

Now, the operation of the controlling system will be described. Referring again to FIG. 4, when the V/Hz value detected by the divider 85 is larger than the desired control value 81, the output of the switching device 83 changes from 0.0 to a difference value (=desired control value−V/Hz value). As an examle, suppose that the desired control value is 1.1 pu, V=1.2 pu and F=1.0 pu, the switching device 83 outputs 1.1 pu−1.2 pu=−0.1 pu, so that the output of the integrator 84 is changed to one direction in accordance with an inclination of the integrating time constant T. The output of the integrator 84 is added to the desired control value 62 of the AVR 62.

The initial desired control value V of the AVR 62 is 1.2 pu and therefore, it assumes V=1.2 pu. When the sum of the desired control value 62 (1.2 pu) and the output of the integrator 84 (−0.1 pu) becomes 1.1 pu, the output of the synchronous machine 1 becomes 1.1 pu. At this time, V=1.1 pu and F=1.0 pu, and it results in V/Hz=1.1 pu so that the output of the switching device 83 turns to be 0.0. Since the output value of the integrator does not change any more when the input thereof becomes 0.0, the system is balanced. At this point, the V/Hz value is perfectly coincident with the desired 1.1 pu, thus completing the V/Hz control in the desired manner.

Although the exciter 3 is a rotary exciter having gain and first-order lag characteristic in the first embodiment, a static exciter with an almost negligible first-order lag may be used. Moreover, although the control function of the AVR 6 is represented by gains and first-order lead/lag functions, a feedback loop for feeding back the output of the exciter may be provided to compensate the lag of the exciter. Further, the present control apparatus is digital, but this invention is applicable to an analog AVR with the same effect as above.

EMBODIMENT 2

Figure 2:
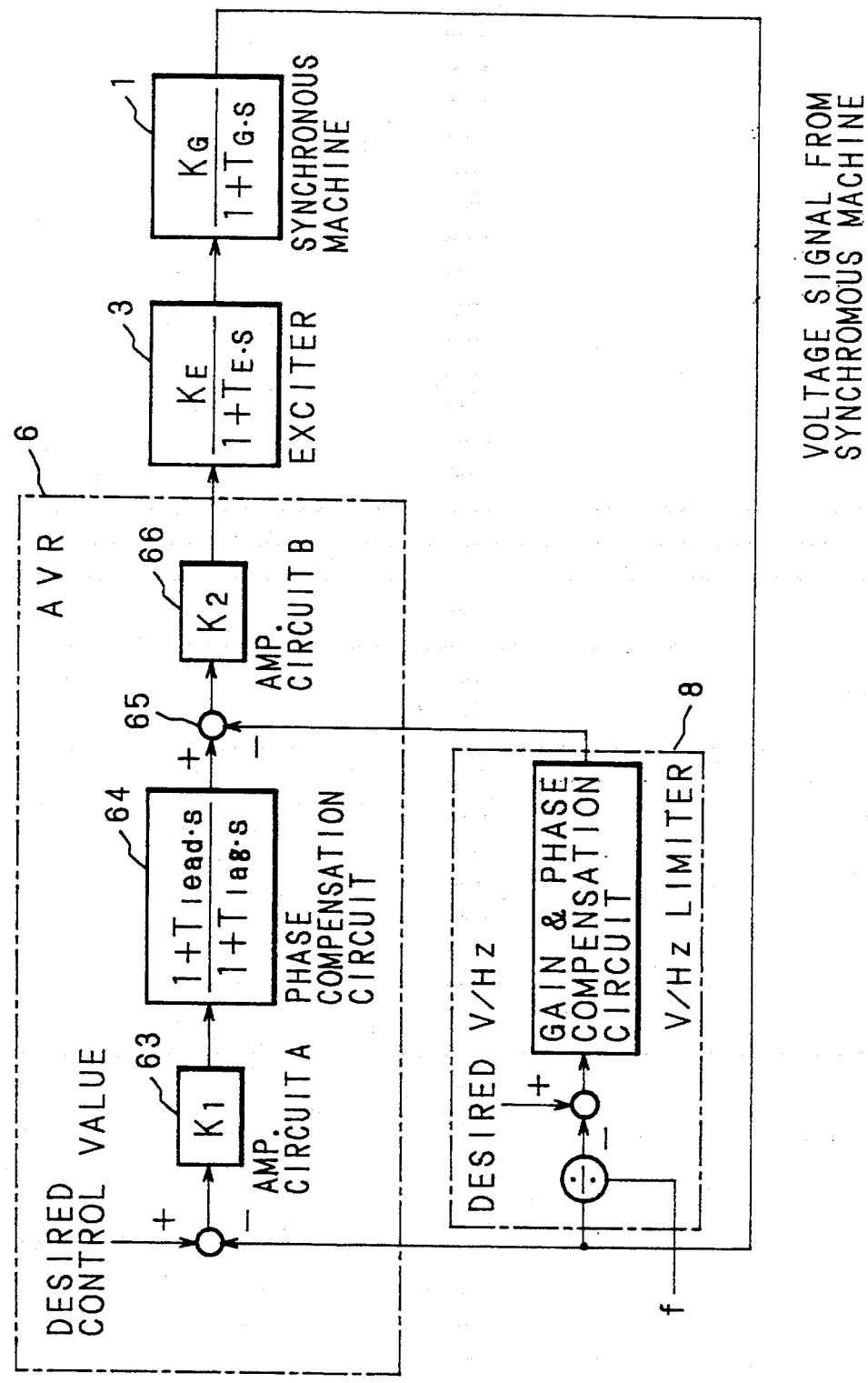
FIG. 2 is a block diagram of the transfer function of the conventional excitation controlling system.
Figure 5:
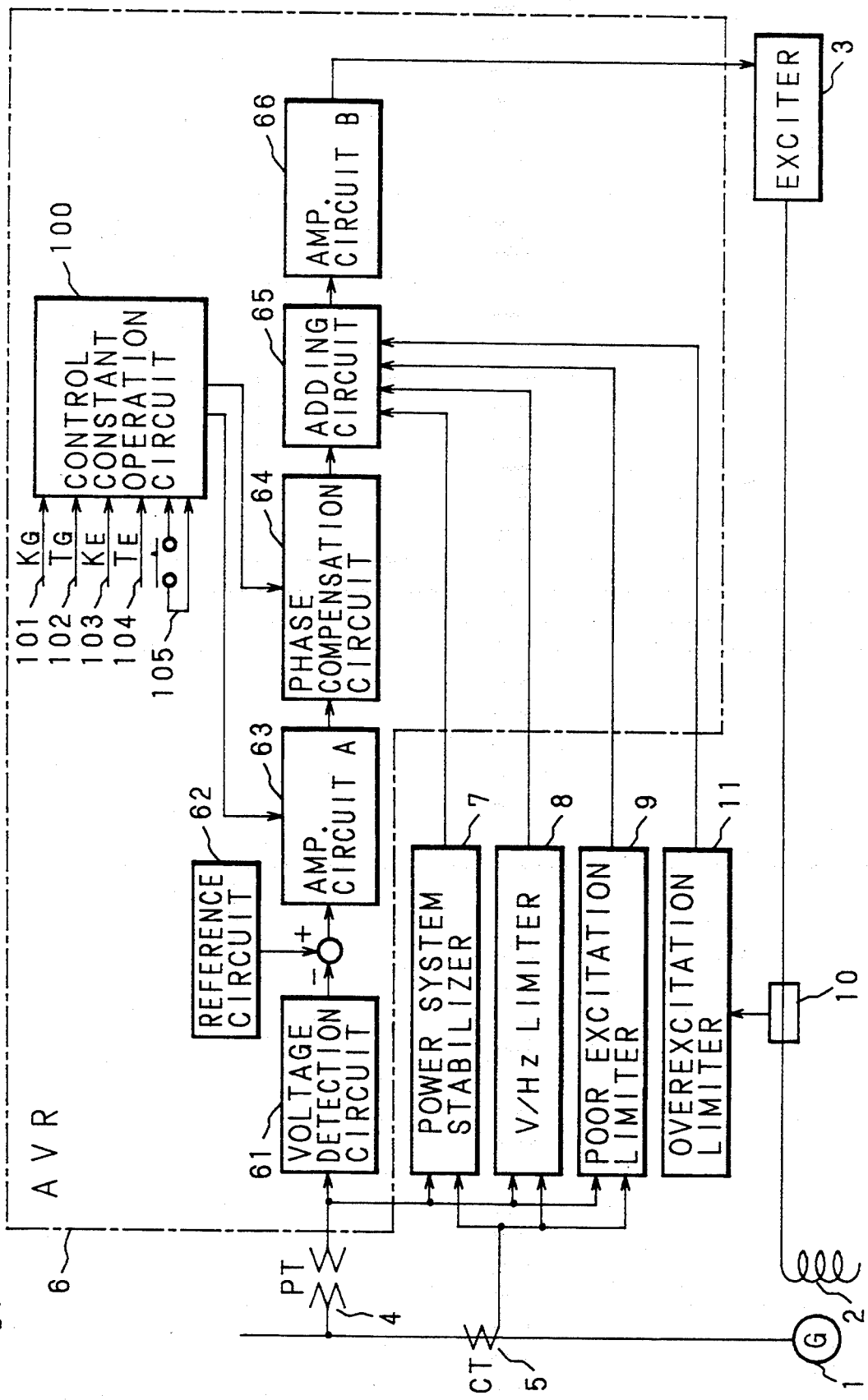
FIG. 5 is a structural diagram of an excitation controlling system according to a second embodiment of this invention.

FIG. 5 is a structural block diagram of an excitation controlling system according to a second embodiment of this invention, wherein the same parts are denoted by the same reference numerals as in FIGS. 1–3, with the description thereof being abbreviated here for brevity. In FIG. 5, addition reference numerals are respectively: 100 a control constant operation circuit which determines control constants of the amplifier circuit A 63 and the phase compensation circuit 64, 101 a gain $K_G$ of the synchronous machine 1, 102 a time constant $T_G$ of the synchronous machine 1, 103 a gain $K_E$ of the exciter 3, 104 a time constant $T_E$ of the exciter 3, and 105 a tuning switch to instruct the operation of the control constant operation circuit 100. Those gains and time constants are set by a setting means (not shown) respectively.

Figure 6:
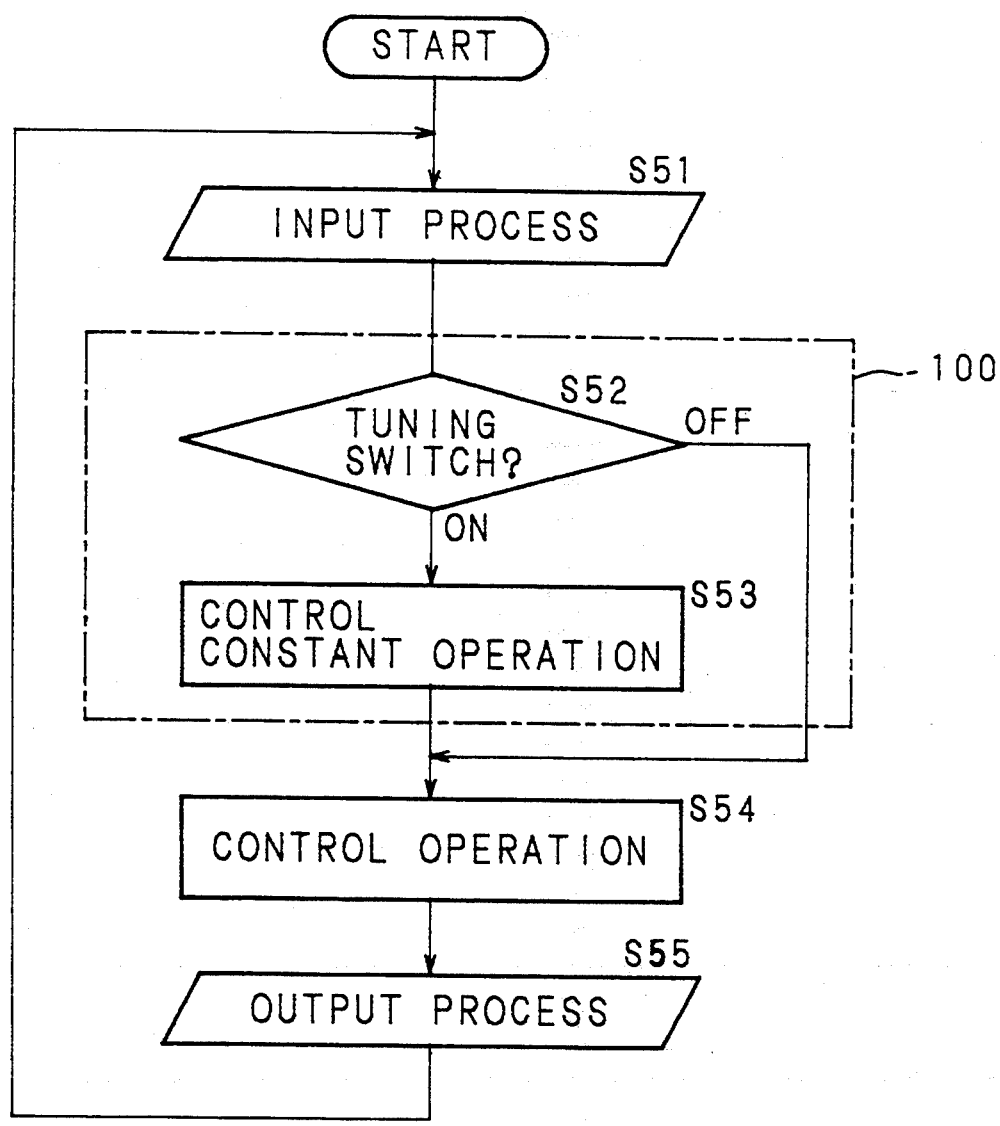
FIG. 6 is a flowchart of the operating process in the second embodiment.

The operation of the controlling system of FIG. 5 will be described with reference to a flowchart in FIG. 6. A zero cross frequency $\omega c$ and a phase margin $\theta m$ are internally set within the control constant operation circuit 100. The gain $K_G$, time constant $T_G$, gain $K_E$ and time constant $T_E$ are set to the operation circuit 100 from outside (S51). Whether the tuning switch 105 is turned ON or OFF is judged (S52), and if the tuning switch 105 is ON, the following equations (1), (3) and (4) are operated (S53).

$$T_{lead} = T_E \tag{1}$$

Figure 7:
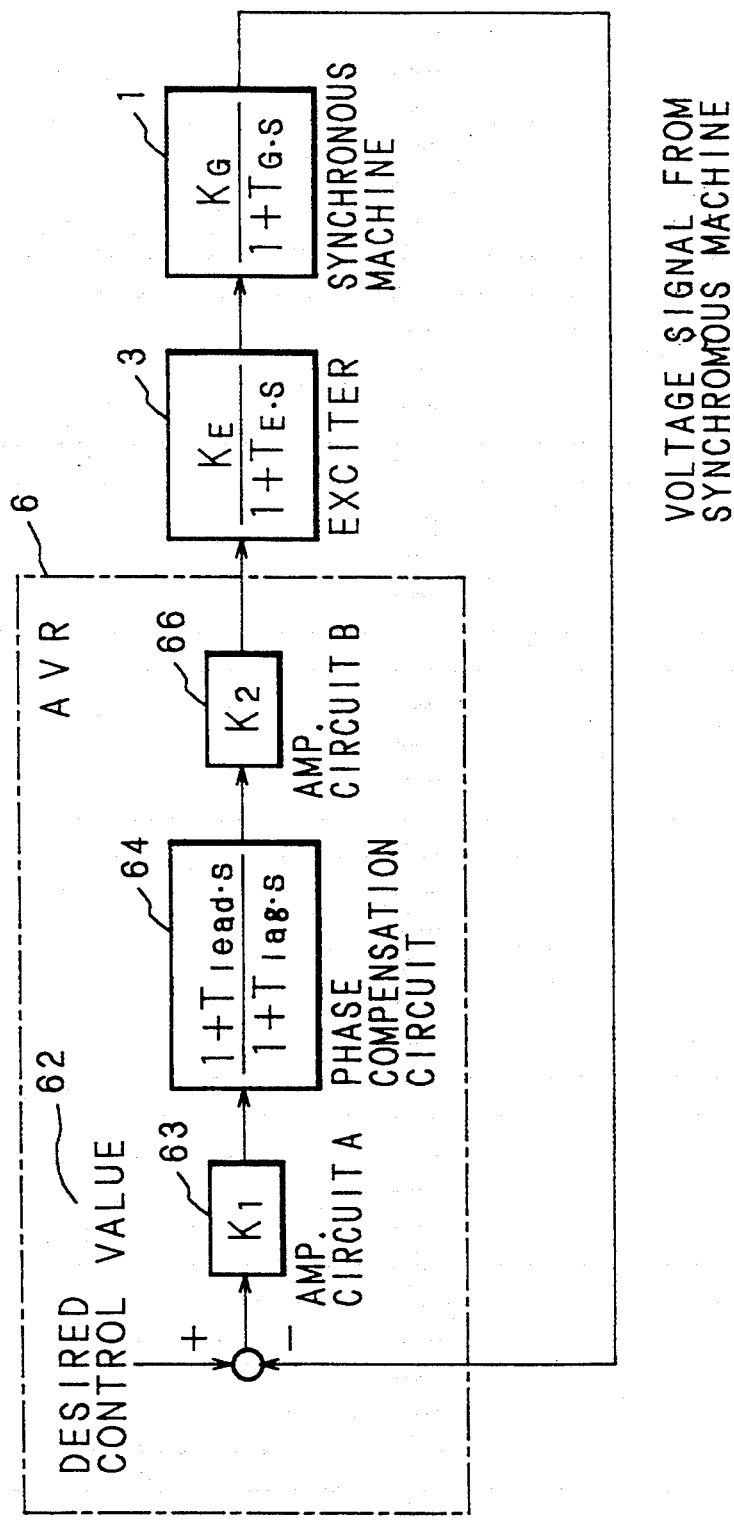
FIG. 7 is a block diagram of the transfer function of the second embodiment.

The forward transfer function in a transfer function block diagram in FIG. 7 is represented as follows;

$$K_1 \cdot K_2 \cdot K_e \cdot K_G = \frac{1}{1 + T_{lag} \cdot S} \frac{1}{1 + T_G \cdot S} \tag{2}$$

$T_{lag}$ is determined according to the formula (3) below so that the function of the formula (2) has such characteristic that the zero cross frequency is $\omega c$ and the phase margin is $\theta m$.

$$T_{lag} = \frac{\tan[180° - \theta m - \tan^{-1}(\omega c T_G)]}{\omega c} \tag{3}$$

Further, $K_1$ is determined similarly.

$$K_1 = \frac{[1 + (\omega c T_{lag})^2]^{\frac{1}{2}} [1 + (\omega c T_G)^2]^{\frac{1}{2}}}{K_2 \cdot K_E \cdot K_G} \tag{4}$$

The AVR 6 of the instant embodiment operates (S55) with use of the above-obtained control constants $K_1$, $T_{lead}$ and $T_{lag}$ thereby to control the exciter 3 (S56).

Accordingly, if only the gain $K_G$ and time constant $T_G$ of the synchronous machine 1, gain $K_E$ and time constant $T_E$ of the exciter 3 are set, the control constants $K_1$, $T_{lead}$, $T_{lag}$ are automatically operated, thus making it easy to adjust the control constant and obtain the optimum one. The time constant naturally never differs depending on the controlling people.

Even in a structure with the gain $K_G$, time constant $T_G$ of the synchronous machine 1, gain $K_E$ and time constant $T_E$ of the exciter 3 set by hardware (setting device), an internal parameter may be used in the case where the AVR is of a digital type.

EMBODIMENT 3

Figure 8:
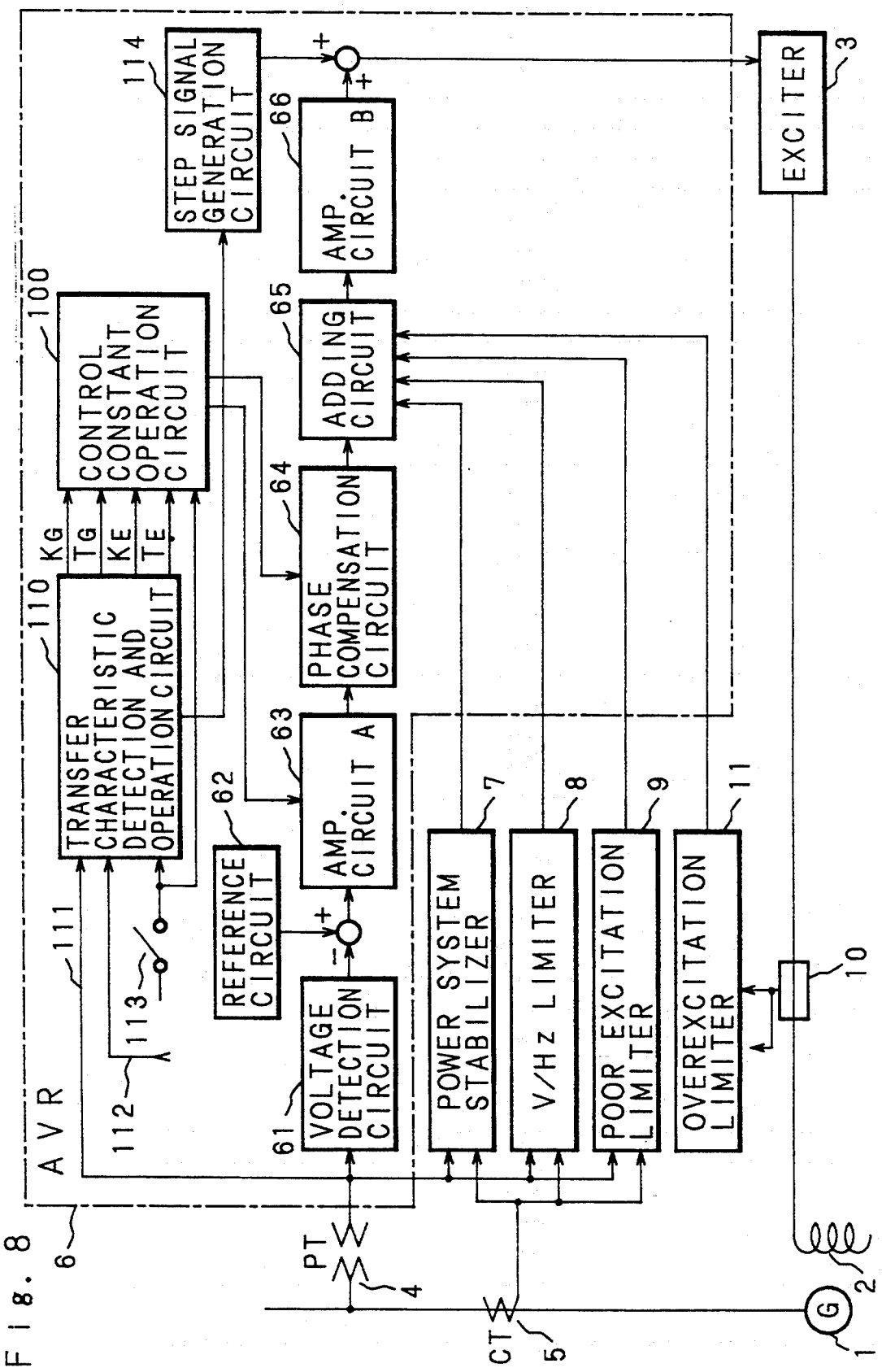
FIG. 8 is a structural block diagram of an excitation controlling system according to a third embodiment of this invention.

An excitation controlling system according to a third embodiment of this invention is indicated in the block diagram of FIG. 8. The same parts of the third embodiment as in FIG. 1 and in the first and second embodiments will be designated by the same reference numerals, the description of which will be omitted. In FIG. 8, references show respectively: 110 a transfer characteristic detection/operation circuit for detecting/operating gains and time constants of the synchronous machine 1 and exciter 3, $K_G$, $T_G$, $K_E$ and $T_E$ gains and time constants of the synchronous machine 1 and the exciter 3 operated by the transfer characteristic detection/operation circuit 110 respectively, 111 a voltage signal outputted from the synchronous machine I and detected by the PT 4, 112 a current signal outputted from the exciter 3 and detected by the shunt 10, 113 an auto-tuning instruction switch for instructing the transfer characteristic detection/operation circuit 110 and control constant operation circuit 100 to or not to operate, and 114 a step signal generation circuit for applying a step signal to the output of the amplifier circuit B 66 in response to the instruction from the transfer characteristic detection/operation circuit 110.

Figure 9:
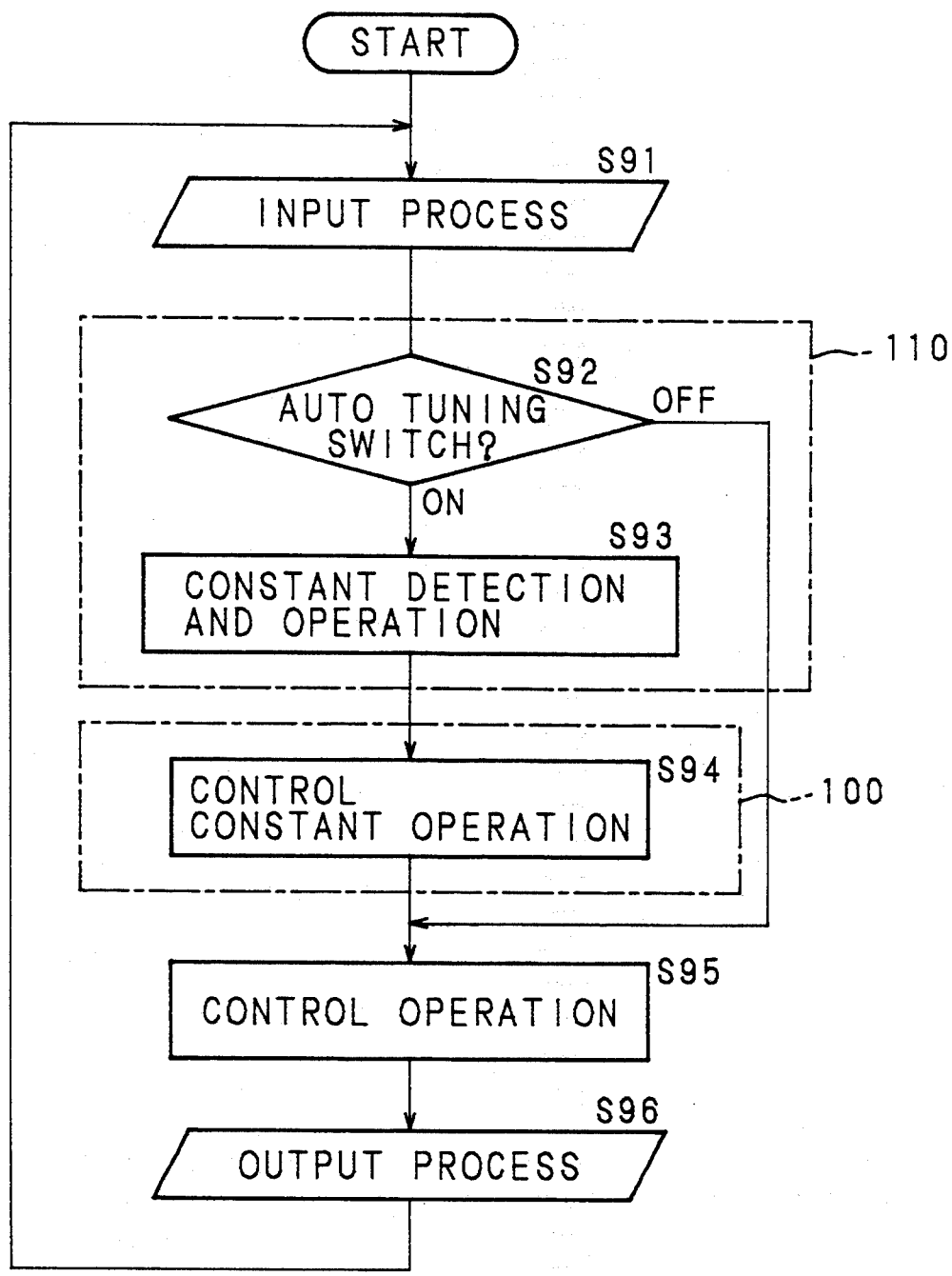
FIG. 9 is a flowchart of the operating process in the third embodiment.
Figure 10:
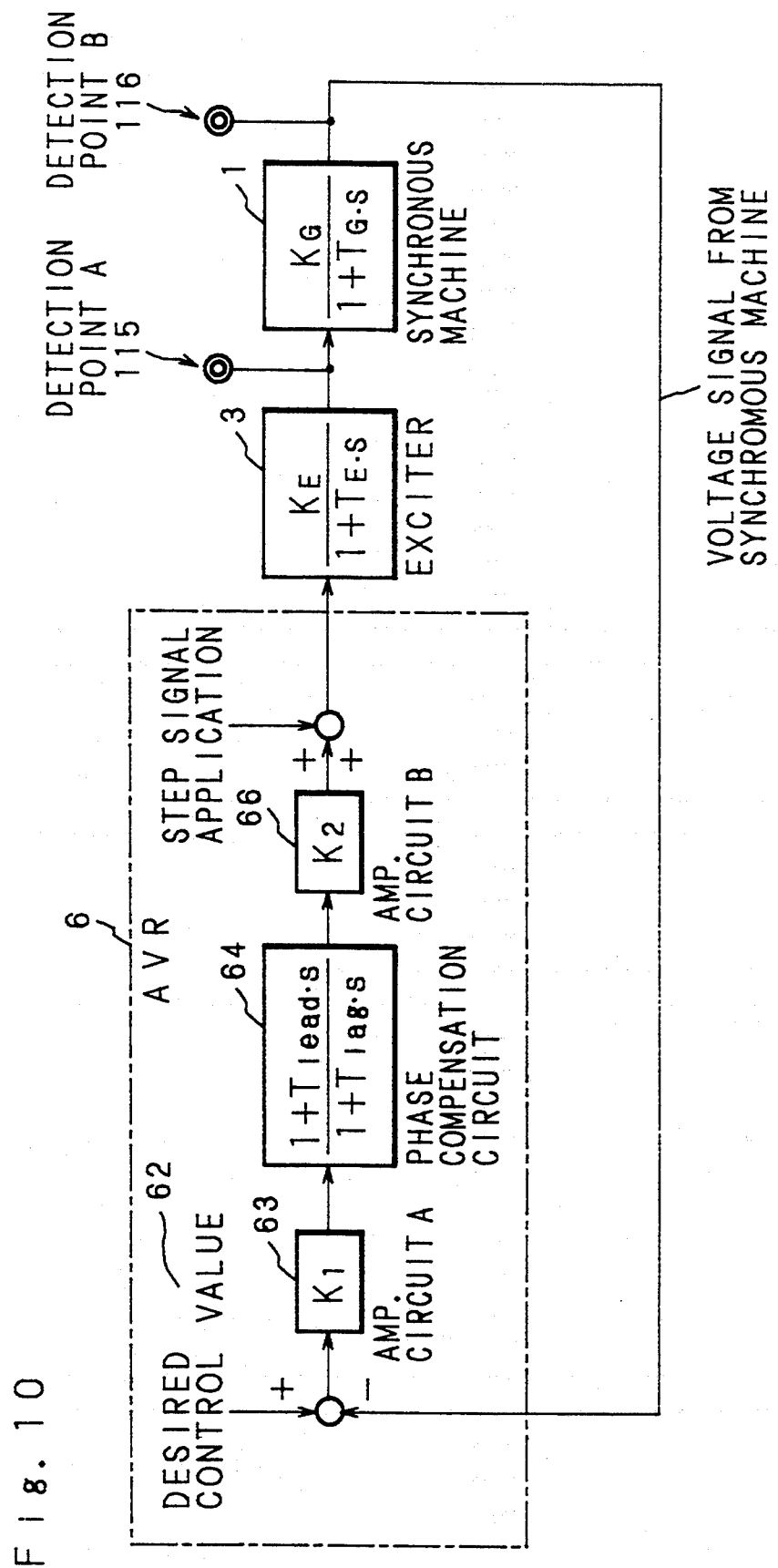
FIG. 10 is a block diagram of the transfer function of the third embodiment.
Figure 11:
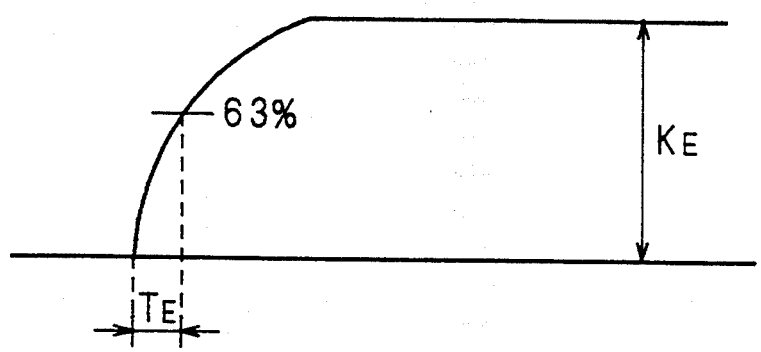
FIG. 11 is a diagram of the step response waveform of an output current of an exciter.

The operation of the controlling system in the above-described structure will be explained with reference to the flowchart of FIG. 9. FIG. 9 indicates the timing of the operations by the transfer characteristic detection/operation circuit 110 and control constant operation circuit 100 in the whole of the AVR 6. Before the detection/operation of the transfer characteristic, whether the auto-tuning instruction switch 113 is turned ON is detected (S92). If the switch 113 is in the ON state, the transfer characteristic is operated (S93). The transfer characteristic detection/operation circuit 110 generates an instruction to the step signal generation circuit 114, thereby to apply a stepped disturbance signal to the output of the amplifier circuit B 66. As the output current signal 112 of the exciter detected by the shunt 10 is inputted to the transfer characteristic detection/operation circuit 110 (S91), the data when the changing volume of the peak value is within a predetermined range is selected and denoted as $K_E$ through analysis of the data stored in a built-in memory as shown in FIG. 11. Then, the time until the value reaches 63% of the final value $K_e$ is rendered $T_E$. In other words, the step response at a detection point A115 of FIG. 10 is measured and, the gain $K_E$ and time constant $T_E$ of the exciter 3 are obtained.

Figure 12:
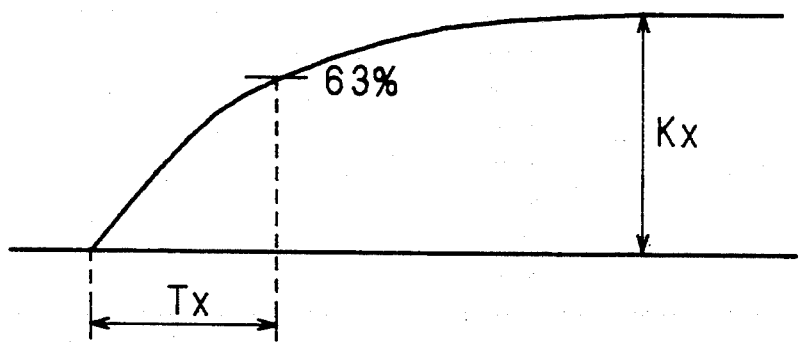
FIG. 12 is a diagram of the step response waveform of an output voltage of a synchronous machine.

FIG. 12 is a waveform diagram when the time and peak value are stored in a memory by inputting the voltage signal from the synchronous machine 1 detected by the PT 4 to the transfer characteristic detection/operation circuit 110 (S91). The data when the changing volume of the peak value is within a predetermined range is selected as $K_X$ by analyzing the data in the memory. Moreover, the time $T_X$ until the value reaches 63% of the final value $K_X$ is obtained. That is, the response at a detection point B116 is measured. The response at the detection point B116 is expressed by a second-order functions as in a formula (5) below;

$$G(S) = \frac{K}{1 + T_E S} \cdot \frac{K}{1 + T_G S} \quad (5)$$

$$= \frac{K_E \cdot K_G}{1 + (T_E + T_G) S + T_E \cdot T_G \cdot S^2}$$

A-term of high-order is negligible in general, and therefore the term $S^2$ can be omitted as follows;

$$G(S) = \frac{K_E \cdot K_G}{1 + (T_E + T_G) S} = \frac{K_X}{1 + T_X S} \quad (6)$$

As a result, the gain $K_G$ and time constant $T_G$ of the synchronous machine 1 are obtained according to the formulae (7) and (8);

$$T_G = T_X - T_E \quad (7)$$

$$K_G = K_X/K_E \quad (8)$$

The control constant operation circuit 100 operates the control constants $K_1$, $T_{lead}$, $T_{lag}$ of the AVR 6 in the same manner as in the second embodiment using the gain $K_G$, time constant $T_G$ of the synchronous machine, and the gain $K_E$, and time constant $T_E$ of the exciter 3 operated by the transfer characteristic detection/operation circuit 110 along with the zero cross frequency $\omega c$ and phase margin $\theta m$ which are factors to determine the specifications of the control system incorporated inside (S94).

$$T_{lead} = T_E \quad (9)$$

The forward transfer function of the voltage function block diagram of FIG. 10 becomes as follows from the formula (9);

$$K_1 \cdot K_2 \cdot K_E \cdot K_G \cdot [1/(1+T_{lag} S)] [1/(1+T_G S)] \quad (10)$$

$T_{lag}$ is determined as below so that the function of the formula (10) has such characteristic that the zero cross frequency is $\omega c$ and phase margin is $\theta m$.

$$T_{lag} = \frac{\tan[180° - \theta m - \tan^{-1}(\omega c T_G)]}{\omega} \quad (11)$$

Moreover, $K_1$ is determined likewise.

$$K_1 = \frac{\sqrt{1 + (\omega c T_{lag})^2} \sqrt{1 + (\omega c T_G)^2}}{K_2 \cdot K_e \cdot K_G} \quad (12)$$

As indicated by the above formulae (9), (11) and (12), if the constants $K_G$, $T_G$, $K_E$ and $T_E$ and $\omega c$ and $\theta m$ indicating the specifications of the controlling system are determined, the control constants $K_1$, $T_{lead}$, $T_{lag}$ are automatically determined. The operations according to the formulae (9), (11) and (12) are conducted by the control constant operation circuit 100 (S95), thereby to output a control signal for the exciter 3 (S96).

In the foregoing second and third embodiments, the exciter 3 is a rotary exciter having a gain and first-order lag characteristic. However, a static exciter having a negligible first-order lag characteristic can be employed.

Moreover, although the control function of the AVR 6 is represented by gains and first-order lead/lag functions, a minor loop, i.e., an output feedback loop can be provided to compensate for the lag of the exciter.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. An excitation control apparatus for a synchronous machine, comprising:
   an exciter; and
   an automatic voltage regulator means for controlling the output voltage from the synchronous machine so as to coincide with a desired control value by controlling a current output from the exciter to the synchronous machine, the automatic voltage regulator means including
   a transfer characteristic circuit means for directing and operating respective constants of transfer characteristics of the exciter and the synchronous machine by detecting the output current of the exciter and the output voltage of the synchronous machine; and
   a control constant operation circuit means for operating a control constant for automatic voltage regulation from the constants of the transfer characteristics of the exciter and synchronous machine, and from constants for defining the control specification.

2. An excitation control apparatus for a synchronous machine as set forth in claim 1, wherein the control constants of the automatic voltage regulator are defined by gains and first-order lead/lag functions.

3. An excitation control apparatus for a synchronous machine as set forth in claim 1, wherein a feedback loop for compensating lag of the exciter is provided.

4. An excitation control apparatus for a synchronous machine as set forth in claim 6, further comprising:
   a switch for directing said transfer characteristic circuit means and said control constant circuit means to start.

5. An excitation control apparatus for a synchronous machine as set forth in claim 1, further comprising:
   a step signal generating circuit for outputting step signals to the excitation system of the synchronous machine.

6. An excitation control apparatus for a synchronous machine as set forth in claim 1, wherein said exciter is a rotary exciter with gain and first-order lag characteristic.

7. An excitation control apparatus for a synchronous machine as set forth in claim 1, wherein said exciter is a static exciter whose first-order lag is almost negligible.

8. An excitation control apparatus for a synchronous machine, comprising:
   an exciter;
   an automatic voltage regulator for controlling the output voltage from the synchronous machine so as to coincide with a desired control value by controlling a current output from the exciter to the synchronous machine according to determined control constants, the automatic voltage regulator including a setting means for setting respective first constants of transfer characteristic of the exciter and the synchronous machine, an operation circuit for determining said determined control constants from the first constants, an amplifier coupled to said operation circuit to receive at least one of said determined constants to thereby control the amplification, and a phase compensation circuit coupled to said operation circuit to receive at least one of said determined control constants to thereby control the phase compensation.

9. An excitation control apparatus for a synchronous machine as set forth in claim 8, wherein the determined control constants of the automatic voltage regulator are defined by gains and first-order lead/lag functions.

10. An excitation control apparatus for a synchronous machine as set forth in claim 8, wherein a feedback loop for compensating lag of the exciter is provided.

11. An excitation control apparatus for a synchronous machine as set forth in claim 8, wherein said exciter is a rotary exciter with gain and first-order lag characteristic.

12. An excitation control apparatus for a synchronous machine as set forth in claim 8, wherein said exciter is a static exciter whose first-order lag is almost negligible.

13. An excitation control apparatus for a synchronous machine as set forth in claim 8, further comprising:

a switch for directing said operation circuits to start the operation.

* * * * *

UNITED STATES PATENT AND TRADEMARK OFFICE
CERTIFICATE OF CORRECTION

PATENT NO. : 5,440,222
DATED : August 8, 1995
INVENTOR(S) : Seiichi Tanaka et al.

It is certified that error appears in the above-indentified patent and that said Letters Patent is hereby corrected as shown below:

Col. 7, line 45, in formula 11, "TG" should be -- $T_G$ --; Col. 7, line 50, in formula 12, "TG" should be -- $T_G$ --; <u>In the Claims:</u> Col. 8, line 43 (claim 4), "claim 6" should be -- claim 1 --; Col. 10, line 16 (claim 13), delete "the operation".

Signed and Sealed this

Fifth Day of December, 1995

*Attest:*

BRUCE LEHMAN

*Attesting Officer*     Commissioner of Patents and Trademarks